July 30, 1963 L. R. SCHWARTZ ETAL 3,099,243
MOVING SIGNAL ACCESSORY FOR BICYCLES
Filed Feb. 28, 1961
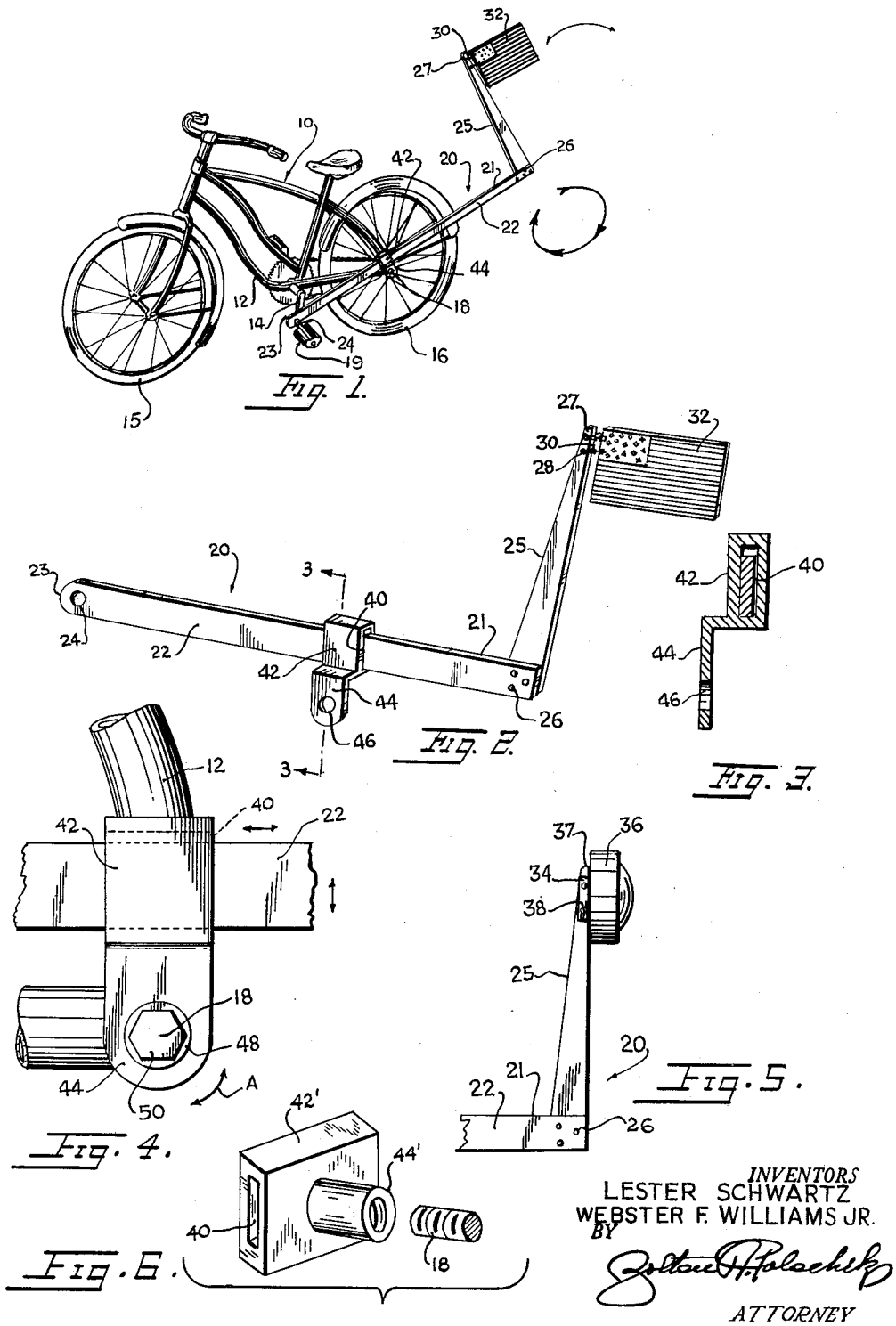
INVENTORS
LESTER SCHWARTZ
WEBSTER F. WILLIAMS JR.
BY
ATTORNEY

3,099,243
MOVING SIGNAL ACCESSORY FOR BICYCLES

Lester R. Schwartz, 20—39 Seagirt Blvd., Far Rockaway, N.Y., and Webster F. Williams, Jr., 90—20 221 Place, Queens Village, N.Y.
Filed Feb. 28, 1961, Ser. No. 92,214
4 Claims. (Cl. 116—28)

This invention concerns a moving signal accessory for a bicycle.

According to the invention there is provided a bearing member which can be pivotally mounted on the rear axle of a bicycle. A bar is slidably disposed in the bearing. One end of the rod engages on a portion of the bicycle pedal crank. The other end of the bar carries an upright post upon which can be mounted a signal lamp, flag, sparkler or the like. As the bicycle is pedaled, the bar reciprocates and pivots causing the signal device on the end of the post to move in an elliptical path.

It is therefore one object of the invention to provide an attention attracting attracting accessory for a bicycle.

A further object is to provide an accessory engaged with a pedal crank and axle of a bicycle to move the accessory for signaling purposes.

Another object is to provide a bearing member provided with a slidable bar, the slidable rod being engageable on a bicycle pedal crank and the bearing member being engageable on an axle of a bicycle, and a post supported in a vertical plane on the bar, the post being adapted to carry a flag, sparkler lamp or the like, and move in a vertical plane in an elliptical path as the bicycle is pedaled.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a bicycle with an accessory assembly embodying the invention mounted thereon.

FIG. 2 is a perspective view of the accessory assembly on an enlarged scale, removed from the bicycle.

FIG. 3 is a cross sectional view on a further enlarged scale taken on line 3—3 of FIG. 2.

FIG. 4 is a partial fragmentary elevational view on an enlarged scale of the accessory assembly and axle mount of the bicycle.

FIG. 5 is a fragmentary side elevational view of the accessory assembly with a lamp carried on the post.

FIG. 6 is a front perspective disassembled view of a modified form of bearing for the actuating bar and associated axle.

Referring to FIGS. 1–4, there is shown a bicycle 10 having a frame 12 carrying a pedal crank 14. The bicycle has a front wheel 15 and rear wheel 16 mounted on a rear axle 18 carried by the frame.

An accessory assembly 20 embodying the invention includes an elongated flat, straight bar 22 having a round opening 24 at one end 23 adapted to fit on and engage on the outer end of pedal crank 14 and held thereon by pedal 19. At its other end 21, the bar carries an upright post 25 secured by screws or rivets 26 to the end of the bar. The post may be tapered in form. At its distal free end 27 there is provided holes 28 to which strings 30 of a flag 32 may be tied, as shown in FIGS. 1 and 2. Alternatively, a bracket 34 of a lamp 36 can be secured by screws 38 to the end of the post as shown in FIG. 5.

The bar 22 is slidably mounted in a rectangular or round passage 40 of a block-shaped bearing member 42 sleeved on bar 22. The bearing member has an offset plate forming an extension 44 provided with a round hole 46. The rear axle 18 passes loosely through the hole 46. A washer 48 and nut 50 shown in FIG. 4 secure the bearing member 42 on the axle laterally of the rear wheel 16 of the bicycle. Thus, the bearing member 42 can pivot angularly as indicated by arrow A in FIG. 4 when the bicycle is in motion, by means of the pedals 19, and can move the bar and post accordingly.

A modified manner of mounting the block-bearing is shown in FIG. 6 wherein the block 42' is provided with a threaded socket member 44' extending radially from one side of the block-bearing adapted to be threaded onto the threaded rear axle extension 18'.

The flag 32 or other signaling member on the post such as the lamp 36 will move in an elliptical path in a vertical plane as the end 23 of the bar 22 is moved in a vertical plane by the crank 14. The bar will slide back and forth in the bearing member 42 and the post will execute corresponding elliptical movements in the vertical plane of movement of the bar.

It is to be understood that instead of a flag 32 or lamp 36 any other suitable article or ornament, such as a sparkler, bell and the like may be substituted in order to enhance the appearance of the bicycle and to attract attention.

The accessory assembly does not interfere with the turning of the pedals or the wheels. The assembly effectively attracts attention which is its basic purpose. It is an inexpensive bicycle accessory which is economical to manufacture, simple to install, and long wearing. It may be made of metal or plastic materials by mass production material working machinery at low cost.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. In combination with the rear axle, crank and pedal of a bicycle, a block-shaped bearing member having an offset extension pivotally supported on a protruding end of the rear axle, said bearing member having a central passage therethrough, an elongated rectangular-shaped bar extending through said passage and supported by said bearing member, one end of said bar having a round hole therein receiving the crank of the bicycle and being secured on the crank by the pedal of the bicycle, a post extending at right angles to the plane of the bar and secured at one end to the other end of the bar, and a flag secured to the other end of the post, said bar with attached post and flag adapted to move bodily in an elliptical path upon movement of the crank.

2. In combination with the rear axle, crank and pedal of a bicycle, a block-shaped bearing member having an offset extension pivotally supported on a protruding end of the rear axle, said bearing member having a central passage therethrough, an elongated rectangular-shaped bar extending through said passage and supported by said bearing member, one end of said bar having a round hole therein receiving the crank of the bicycle and being secured on the crank by the pedal of the bicycle, a post extending at right angles to the plane of the bar and secured at one end to the other end of the bar, and a lamp having a bracket secured to the other end of the post, said bar with attached post and lamp adapted to move bodily in an alliptical path upon movement of the crank.

3. A signaling accessory assembly for a bicycle comprising an elongated rectangular-shaped narrow bar having a round hole at one end thereof, for attachment to the crank of a bicycle, a block-shaped bearing member having a central passage therein slidable on the bar, said bearing member having an offset extension with a round hole therein for attachment to the rear axle of a bicycle, a post extending at right angles to the plane of the bar and secured at one end to the other end of the bar, and a flag secured to the other end of the post, said bar with attached post and flag adapted to move bodily in an elliptical path upon movement of the crank.

4. A signalling accessory assembly for a bicycle comprising an elongated rectangular-shaped narrow bar having a round hole at one end thereof for attachment to the crank of a bicycle, a block-shaped bearing member having a central passage therein slidable on the bar, a post extending at right angles to the plane of the bar and secured at one end to the other end of the bar, a flag secured to the other end of the post, and a tubular threaded socket member extending laterally from the center of one side of the bearing member for receiving a threaded extension on one end of the axle of a bicycle, said bar with attached post and flag adapted to move bodily in an elliptical path upon movement of the crank.

References Cited in the file of this patent

UNITED STATES PATENTS

| | | |
|---|---|---|
| 920,382 | Odle | May 4, 1909 |
| 1,365,533 | Nash | Jan. 11, 1921 |
| 1,466,183 | Milliken | Aug. 28, 1923 |
| 1,820,474 | Molinari | Aug. 25, 1931 |
| 2,793,604 | Pararra | May 28, 1957 |
| 2,852,886 | Parker | Sept. 23, 1958 |

FOREIGN PATENTS

| | | |
|---|---|---|
| 1,170,584 | France | Sept. 22, 1958 |